United States Patent
Wu et al.

(10) Patent No.: US 6,668,110 B2
(45) Date of Patent: Dec. 23, 2003

(54) OPTICAL SWITCH HAVING IMPROVED SEALING STRUCTURE

(75) Inventors: Kun-Tsan Wu, Tu-Chen (TW); Chien-Cheng Chen, Tu-Chen (TW)

(73) Assignee: A Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/052,281

(22) Filed: Jan. 17, 2002

(65) Prior Publication Data

US 2003/0095740 A1 May 22, 2003

(51) Int. Cl.$^7$ ................................................ G02B 6/35
(52) U.S. Cl. ........................... 385/18; 385/16; 385/137
(58) Field of Search ........................... 385/16–23, 54, 385/55, 86, 92, 94, 100, 134–138, 147; 359/223–226

(56) References Cited

U.S. PATENT DOCUMENTS

| | | | | |
|---|---|---|---|---|
| 4,754,876 A | * | 7/1988 | Noon et al. | 385/135 |
| 5,420,957 A | * | 5/1995 | Burek et al. | 385/135 |
| 5,907,653 A | * | 5/1999 | Burek et al. | 385/135 |
| 6,111,997 A | * | 8/2000 | Jeong | 385/27 |
| 6,218,620 B1 | * | 4/2001 | Michel | 174/92 |
| 2002/0131672 A1 | * | 9/2002 | Wilson et al. | 385/16 |

* cited by examiner

Primary Examiner—Hemang Sanghavi
Assistant Examiner—Scott A Knauss
(74) Attorney, Agent, or Firm—Wei Te Chung

(57) ABSTRACT

An optical switch (1) having a sealing system connects to input fibers (42, 43) and output fibers (44, 45), and includes a switching device (5), a top housing (10), a bottom housing (30), a gasket (20) and four fiber clamps (40). The top and bottom housings each define a ringed channel (104, 304). The gasket includes a plurality of quadrate flanges (206). Each quadrate flange defines an elliptic opening (208) for inserting a fiber clamp holding a fiber. The gasket is received in the ringed channels of the top and bottom housings. When screws combining the top and bottom housings together are tightened, the gasket deforms to fill the ringed channels, thereby forming a good seal between an inside and an outside of the housing. The elliptic openings promote a balancing of stress in the quadrate flanges, increasing the life of the gasket.

20 Claims, 4 Drawing Sheets

OPTICAL SWITCH HAVING IMPROVED SEALING STRUCTURE

BACKGROUND OF THE INVENTION

1. Field of the Invention

The present invention relates to an optical switch, and particularly to an optical switch having an improved sealing structure.

2. Description of Related Art

An optical switch is a passive optical component for switching optical signals between input fibers and output fibers, and is widely used in optical transmission systems and in optical networks. To assure good performance of the optical switch, the influence of the environment on the switch has to be reduced. Hence, a good sealing structure to protect the optical elements in the switch is increasingly important.

A sealing structure for an optical component must provide good stability and isolation, so must exclude dust and vapor from an inside of the optical component. Present sealing structures for optical components mainly use epoxy resin to mount fibers into two housings, with the two housings being engaged together by screws. Such sealing structures provide a low level of isolation, which fails to exclude vapor and dust from an interior of the optical component. Optical efficiency of the optical component is, therefore, at risk.

Other sealing structures use a rubber-ring situated at entrances and in junctures between housing halves to achieve a seal. Such rubber-rings are designed to conform to a shape of the entrances and junctures and commonly define circular openings for receiving fiber clamps holding the fibers. However, pressure exerted on the rubber-rings by the fiber clamps is asymmetrical because, although the circular groove of the fiber clamp initially exerts a symmetrical pressure against the circular opening of the rubber-ring, the additional pressure acting against the rubber-ring exerted by the two housing halves when the two housing halves are bound together results in an asymmetric stress in the rubber-ring at the openings. The added stress will result in accelerated aging of the rubber-ring, leading to breakdown and a loss of sealing characteristics over time. This will allow vapor and dust to enter into the optical component, degrading optical efficiency.

For the above reasons, an improved sealing structure for optical components is desired which provides dependable isolation.

SUMMARY OF THE INVENTION

An object of the present invention is to provide an optical switch having an improved sealing structure.

Another object of the present invention is to provide a sealing structure for optical components having good stability and high isolation from the environment.

An optical switch having a sealing structure and connecting to input fibers and output fibers comprises a switching device, a top housing, a bottom housing, a gasket, and a plurality of fiber clamps.

The top housing and the bottom housing are similar in shape and when fit together have substantially a bottle shape. The top housing and the bottom housing each define a channel for receiving the gasket. The gasket defines at least one elliptic opening for receiving a fiber clamp holding a fiber. The gasket is received in the channels of the top and bottom housings, and fills the channels when pressure is applied by screws combining the top and bottom housings together. Good isolation is achieved in a space defined between the top and bottom housings.

A similar sealing structure can be used to protect other optical components, such as optical couplers, optical connectors and optical attenuators.

Other objects, advantages and novel features of the invention will become more apparent from the following detailed description when taken in conjunction with the accompanying drawings.

DETAILED DESCRIPTION OF THE INVENTION

Figure 1:
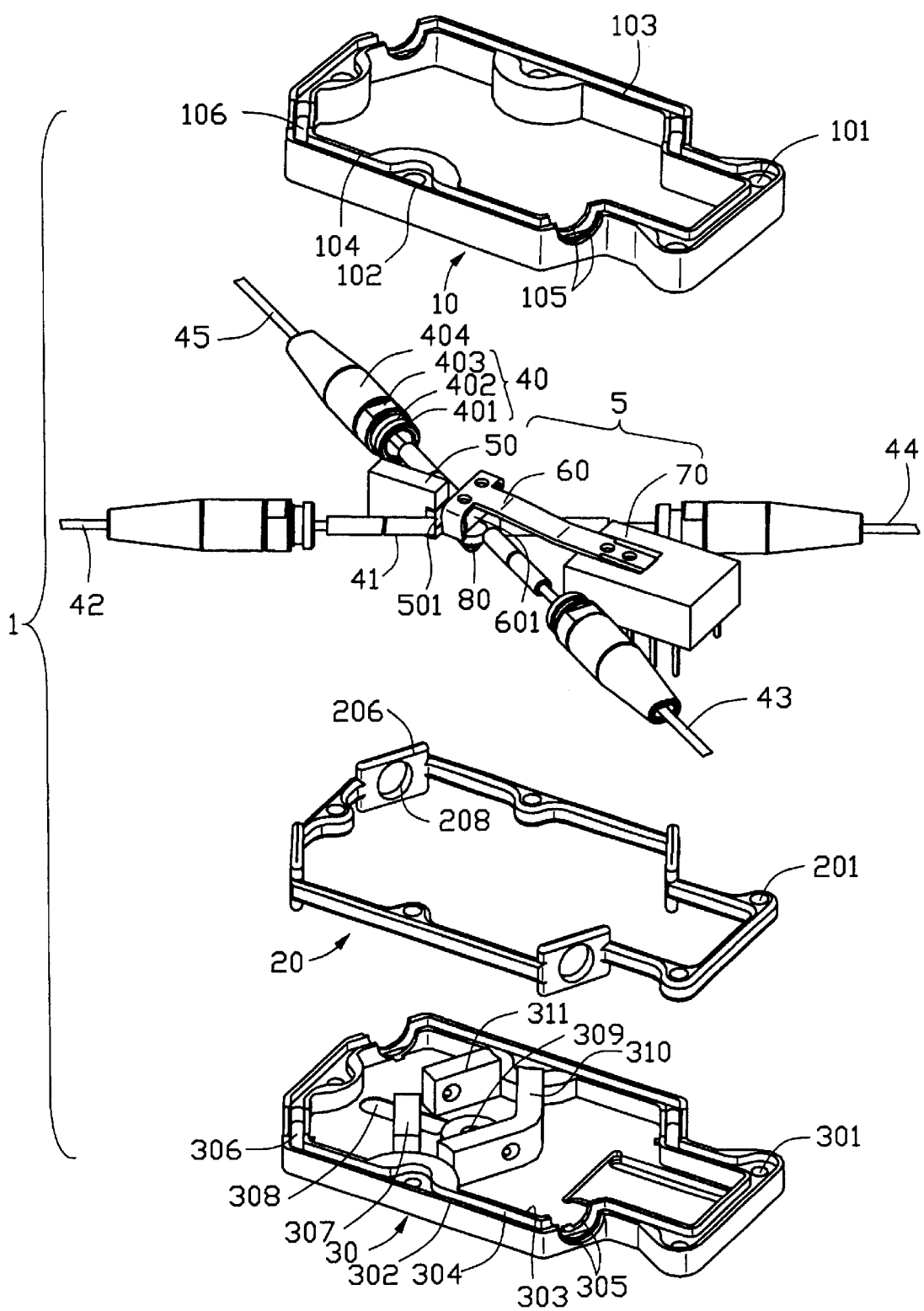
FIG. 1 is an exploded view of an optical switch with a sealing structure according to the present invention.

As shown in FIG. 1, an optical switch having a sealing structure for switching signals coming from input fibers 42, 43 between output fibers 44, 45 comprises a switching device 5, a top housing 10, a bottom housing 30, four fiber clamps 40, four collimators 41, and a gasket 20.

The top housing 10 and the bottom housing 30 are similar in shape, and when assembled together are substantially in the shape of a bottle.

The top housing 10 comprises an inner wall 103 and an outer wall 102, and defines a plurality of screw holes 101 therein. A ringed channel 104 is defined between the inner wall 103 and the outer wall 102. A pair of semi-annular openings 105 is defined in each of two lower sides and in each of two shoulders of the top housing 10. Each pair of semi-annular openings 105 is respectively defined in the inner wall 103 and in the outer wall 102, and a quadrate groove 106 is formed therebetween.

The bottom housing 30 includes an inner wall 303 and an outer wall 302, and defines a plurality of screw holes 301 therein. A ringed channel 304 is formed between the inner wall 303 and the outer wall 302. A pair of semi-annular openings 305 is defined in each of two lower sides and in each of two shoulders of the bottom housing 30. Each pair of semi-annular openings 305 is respectively defined in the inner wall 303 and in the outer wall 302, and a quadrate groove 306 is formed therebetween. The semi-annular openings 105 and the ringed channel 104 of the top housing 10 are similar to the semi-annular openings 305 and the ringed channel 304 of the bottom housing 30. The bottom housing further comprises a slot 308, a mounting hole 309 and mounting walls 307, 310, 311.

Figure 2:
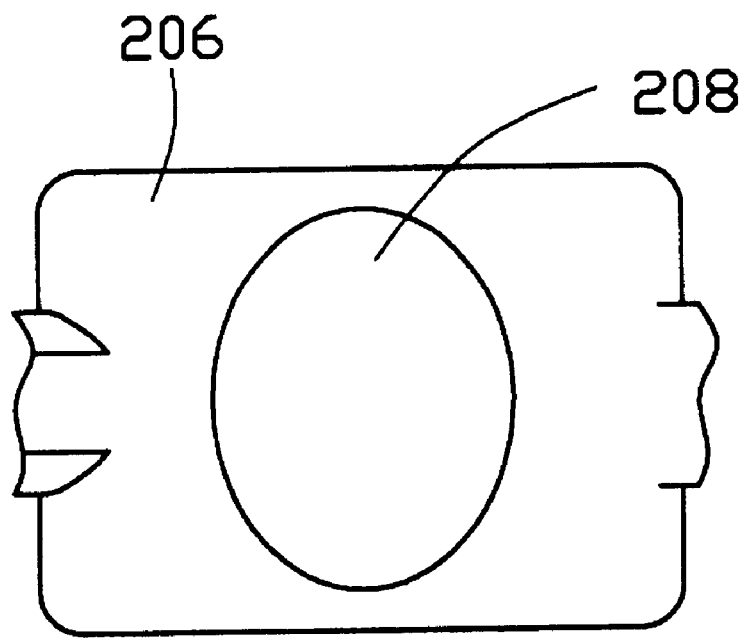
FIG. 2 is a frontal view of a quadrate flange of a gasket of the optical switch of FIG. 1, showing an elliptic opening.

The gasket 20 is substantially the same size and shape as the channels 104, 304. The gasket 20 is made of rubber or other elastic or ductile material. The gasket 20 comprises four quadrate flanges 206 received in the quadrate grooves 106, 306. Referring to FIG. 2, each quadrate flange 206 defines an elliptic opening 208 therethrough. A plurality of through holes 201 are defined through the gasket 20, placed to coincide with the screw holes 101, 301 of the top and bottom housings 10, 30.

The switching device 5 comprises a holding element 50, a reflector 501, a driving arm 60, a two-surface mirror 601 and a driving means 70. The holding element 50 holds the reflector 501 and is mounted in the slot 308 of the bottom housing 30. The two-surface mirror 601 is held and driven to move up and down by the driving arm 60. When the two-surface mirror 601 is displaced out of optical paths between the input fibers 42, 43 and the output fibers 44,45, the light signals from the input fibers 42, 43 are respectively transmitted directly to the output fibers 44, 45. However, when the two-surface mirror 601 is moved into the optical paths, one surface of the two-surface mirror faces the reflector 501 and the two-surface mirror 601 reflects the light signals from the input fiber 42 to the reflector 501, and then the reflector 501 reflects the signals to the two-surface mirror 601, thereafter the two-surface mirror 601 reflects the signals to the output fiber 45; the signals from the input fiber 43 are reflected to the output fiber 44 by the two-surface mirror 601. The switching element 5 further comprises a stopper 80 received in the mounting hole 309 of the bottom housing 30. The stopper 80 is used to limit downward travel of the two-surface mirror 601. The driving means 70 drives the driving arm 60 to move the two-surface mirror 601 up and down The switch 1 further comprises four fiber clamps 40. Each fiber clamp 40 comprises a front flange 401, an annular groove 402 and a rear flange 403. The fiber clamps 40 are inserted into the elliptic openings 208 of the gasket 20, and the annular grooves 402 engage with the elliptic openings 208.

Figure 3:
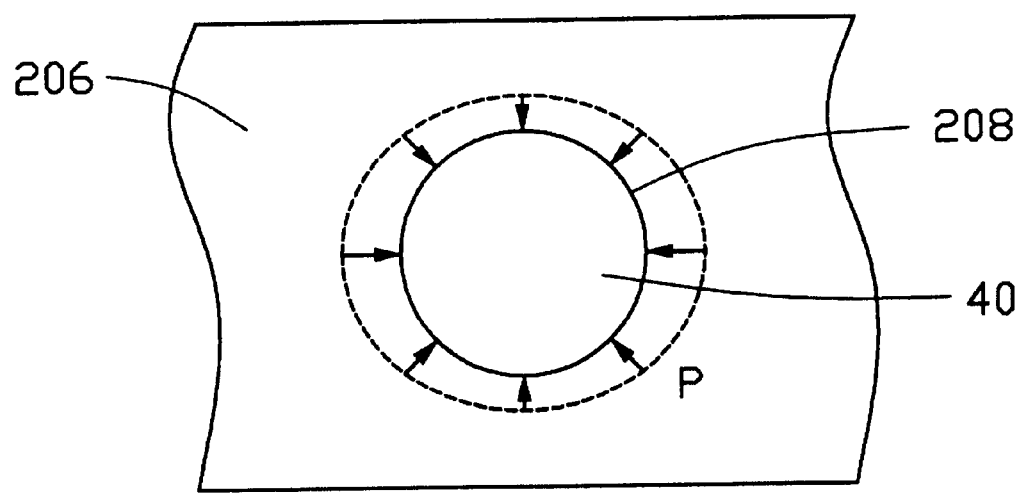
FIG. 3 is a frontal view of the quadrate flange of FIG. 2, depicting forces exerted against a fiber clamp situated in the elliptic opening of the quadrate flange.
Figure 4:
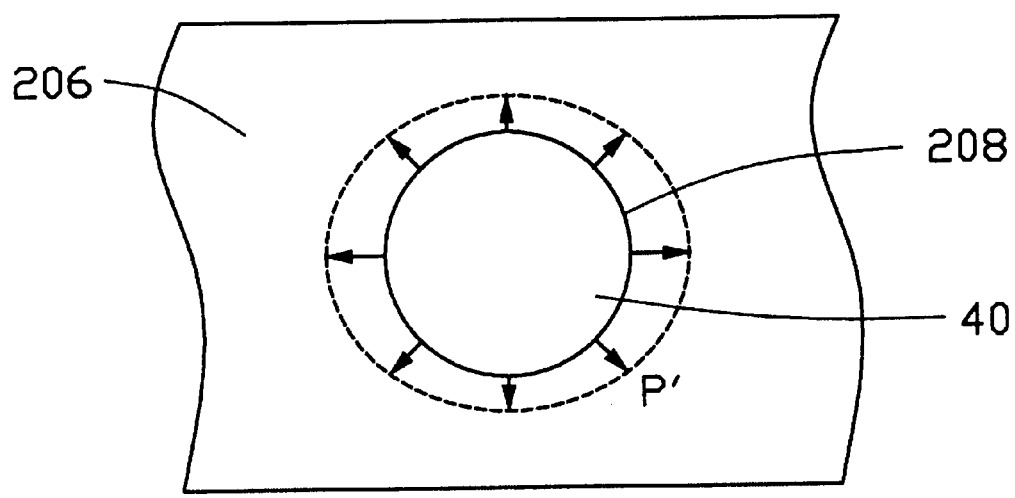
FIG. 4 is a frontal view of the quadrate flange of FIG. 2, depicting stress in the quadrate flange around the elliptic opening resulting from the presence of the fiber clamp in the elliptic opening.

Referring to FIGS. 3 and 4, when the fiber clamp 40 is situated in the elliptic opening 208 of the gasket 20, the forces exerted by the fiber clamp 40 on the quadrate flange 206 and by the quadrate flange 206 on the fiber clamp 40 are asymmetrical. Because of the elliptic shape of the opening 208 in its relaxed state, the forces exerted by the quadrate flange 206 against the circular-shaped fiber clamp 40 (and by the fiber clamp 40 against the quadrate flange 206) are larger at the sides than at the top and bottom of the fiber clamp 40.

Figure 5:
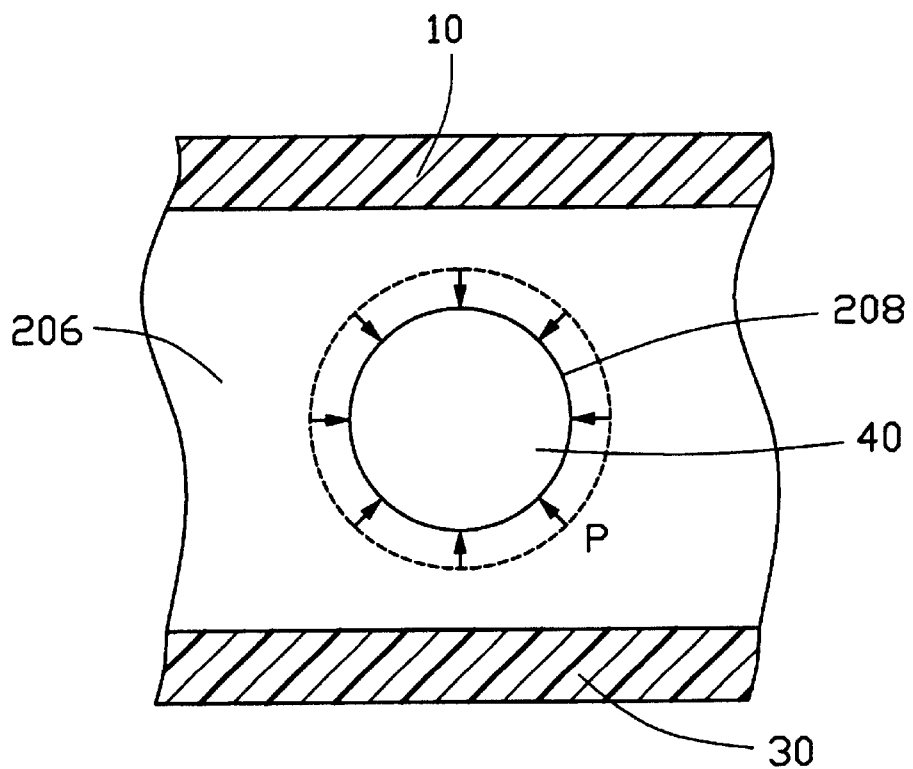
FIG. 5 is a frontal view of the quadrate flange of FIG. 2, depicting forces exerted against a fiber clamp situated in the elliptic opening of the quadrate flange after a top housing and a bottom housing engage with each other.
Figure 6:
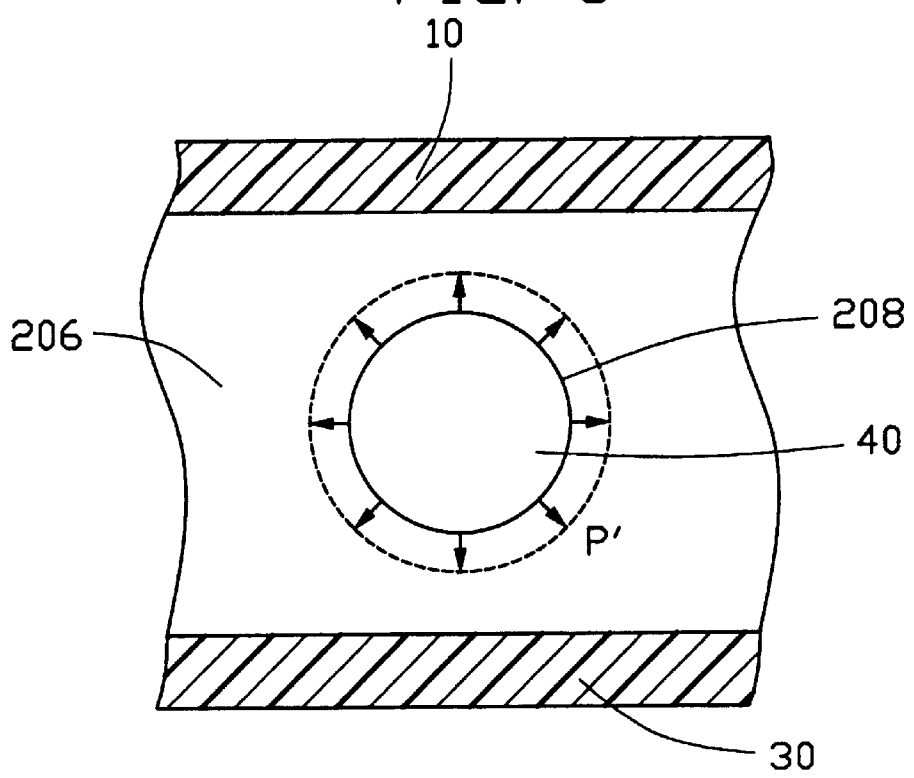
FIG. 6 is a frontal view of the quadrate flange of FIG. 2, depicting stress in the quadrate flange around the elliptic opening resulting from the presence of the fiber clamp in the elliptic opening, after the top housing and the bottom housing engage with each other.

Referring to FIGS. 5 and 6, when the fiber clamp 40 is situated in the elliptic opening 208 of the gasket 20, and the top housing 10 and the bottom housing 30 are in engagement with each other, the forces exerted on the fiber clamp 40 by the quadrate flange 206 and on the quadrate flange 206 by the fiber clamp 40 are uniformly the same all around the circumference of the fiber clamp 40. This is because the top and bottom housings 10, 30 press against and deform the quadrate flange 206 so that the elliptic opening 208 is more circular, even without the fiber clamp 40 forcing it to a circular shape. The stress in the quadrate flange 206 around the fiber clamp 40 is, therefore, more uniform, and the quadrate flange is less prone to uneven wear and aging, improving its stability and resistance to wear.

In assembly, the switching device 5 is situated in a space (not labeled), which is defined between the assembled top and bottom housings 10, 30. The four collimators 41 are separately mounted in the mounting walls 307, 310, 311 of the bottom housing 30 for collimating the signals. The input fibers 42, 43 and output fibers 44, 45 are each held in a corresponding fiber clamp 40 and boot 404. The fiber clamps 40 are inserted into the openings 208 of the gasket 20. The annular groove 402 of each fiber clamp 40 engages with inner and outer walls 103, 102, 303, 302 rimming each of a corresponding pair of semi-annular openings 105, 305 in each of the top and bottom housings 10, 30, and engages with the opening 208 of the gasket 20. The gasket 20 is received in the ringed channels 104, 304 and quadrate grooves 106, 306 of the top and bottom housings 10, 30. When screws (not shown) are threaded through the screw holes 101, 301 and through holes 201 and are tightened, the gasket 20 deforms under the pressure, filling the ringed channels 104, 304 and quadrate grooves 106, 306. The interior (not labeled) of the housing is thereby well sealed and protected from contamination from outside the housing.

The described sealing system, consisting of the top housing 10, the bottom housing 30, the gasket 20 and the fiber clamps 40, can be used to seal other optical components, such as optical couplers, optical connectors and optical attenuators.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical switch having a sealing structure and connected to at least one input fiber and at least one output fiber, comprising:

a switching element for switching signals between the at least one input fiber and the at least one output fiber; and a sealing structure for containing the switching element therein, the sealing structure comprising:
   a top housing defining a ringed channel;
   a bottom housing defining a ringed channel;
   a gasket defining at least one elliptic opening;
   at least one fiber clamp for holding the fibers, the at least one fiber clamp being inserted into the at least one elliptic opening;
   wherein, when the top housing and the bottom housings are engaged with each other, the gasket is situated in the ringed channels of the top and bottom housings and is deformed under a pressure of the engagement to fill the ringed channels of the housings, and the pressure acting against the at least one fiber clamp applied by the gasket is uniformly the same all around the circumference of the fiber clamp.

2. The optical switch having a sealing structure as claimed in claim 1, wherein the switching element comprises a driving arm holding a two-surface mirror, a holding element holding a reflector which is positioned opposite one surface of the two-surface mirror, and a driving means driving the two-surface mirror to move up and down.

3. The optical switch having a sealing structure as claimed in claim 1, wherein the top housing further comprises an inner wall and an outer wall, and the ringed channel for receiving the gasket is defined therebetween.

4. The optical switch having a sealing structure as claimed in claim 3, wherein the bottom housing further comprises an inner wall and an outer wall, and the ringed channel for receiving the gasket is defined therebetween.

5. The optical switch having a sealing structure as claimed in claim 4, wherein at least two semi-annular openings are respectively defined in the inner wall and the outer walls of the top and bottom housings for engaging with the at least one fiber clamp.

6. The optical switch having a sealing structure as claimed in claim 5, wherein the at least one fiber clamp comprises a front flange, an annular groove and a rear flange, and the annular groove engages with the at least one opening of the gasket and the two semi-annular openings of the top housing and the bottom housing.

7. The optical switch having a sealing structure as claimed in claim 6, wherein the gasket further comprises a quadrate flange, and the at least one elliptic opening is defined in the quadrate flange.

8. The optical switch having a sealing structure as claimed in claim 7, wherein a quadrate groove for receiving the quadrate flange is defined between each pair of the semi-annular openings in each of the top housing and the bottom housings.

9. The optical switch having a sealing structure as claimed in claim 1, wherein the top housing and the bottom housing respectively comprise a plurality of screw holes, and the gasket comprises a plurality of through holes corresponding to the screw holes.

10. A sealing structure for optical components comprising:
    a first housing defining a ringed channel;
    a second housing defining a ringed channel; and
    a gasket defining at least one elliptic opening for admitting an entrance of fibers;
    wherein, the first and second housings are engaged together to enclose a space wherein operating parts of the optical component are situated, with the gasket being situated in the ringed channels and between the first and second housings, the gasket being deformed under the pressure of the engagement and filling the ringed channels of the first and second housings.

11. The sealing structure as claimed in claim 10, further comprising at least one fiber clamp for holding the fibers, the at least one fiber clamp being inserted into the at least one elliptic opening, and pressure applied by the gasket against the fiber clamp being uniformly the same all around a circumference of the fiber clamp.

12. The sealing structure as claimed in claim 11, wherein the first housing further comprises an inner wall and an outer wall and the ringed channel for receiving the gasket is defined therebetween.

13. The sealing structure as claimed in claim 12, wherein the second housing further comprises an inner wall and an outer wall and the ringed channel for receiving the gasket is defined therebetween.

14. The sealing structure as claimed in claim 13, wherein at least two semi-annular openings are respectively defined in the inner and outer walls of the first and second housings for engaging with the at least one fiber clamp.

15. The sealing structure as claimed in claim 14, wherein the at least one fiber clamp comprises a front flange, an annular groove, and a rear flange, and the annular groove engages with the at least one elliptic opening of the gasket and the two semi-annular openings of the first and second housings.

16. The sealing structure as claimed in claim 15, wherein the gasket further comprises a quadrate flange, and the at least one elliptic opening is defined in the quadrate flange.

17. The sealing structure as claimed in claim 16, wherein a quadrate groove for receiving the quadrate flange is formed between the two semi-annular openings.

18. The sealing structure as claimed in claim 10, wherein the first housing and the second housing respectively comprise a plurality of screw holes, the gasket has a plurality of through holes corresponding to the screw holes.

19. An optical device comprising a sealing structure, said sealing structure comprising:
    first and second housings sandwiching therebetween a compressible gasket in a pressure manner;
    said gasket defining more than one openings communicating interior and exterior of said first and second housings with each other;
    more than one fiber clamps extending through said openings, respectively; wherein
        each of said openings defines an ellipse-shaped configuration with thereof long and short axes under a condition that said long axis is parallel to a compression direction of said gasket.

20. The optical device as claimed in claim 19, wherein the gasket further comprises at least a quadrate flange, and each of said openings is defined in a corresponding quadrate flange.

* * * * *